United States Patent [19]

Hultmark

[11] Patent Number: 4,726,559

[45] Date of Patent: Feb. 23, 1988

[54] MEANS OF ATTACHMENT

[75] Inventor: Göran Hultmark, Västra Frölunda, Sweden

[73] Assignee: Scandinavian Solar AB, Goteborg, Sweden

[21] Appl. No.: 906,443

[22] Filed: Sep. 12, 1986

[30] Foreign Application Priority Data

Sep. 13, 1985 [SE] Sweden ................................ 8504244

[51] Int. Cl.³ ................................................ A47G 29/02

[52] U.S. Cl. .................................... 248/237; 248/291; 248/300

[58] Field of Search ............... 248/544, 201, 237, 274, 248/200, 289.1, 291, 300, 188.2, 225.1, 225.2

[56] References Cited

U.S. PATENT DOCUMENTS

| | | | |
|---|---|---|---|
| 283,908 | 8/1883 | Manley | 248/237 |
| 713,061 | 11/1902 | Clum | 248/327 |
| 2,371,460 | 3/1945 | Needham | 248/188.2 |
| 2,653,002 | 9/1953 | Passman | 248/291 |
| 2,660,108 | 11/1953 | Baer | 248/274 |

FOREIGN PATENT DOCUMENTS

| | | | |
|---|---|---|---|
| 1122962 | 9/1956 | France | 248/237 |
| 45004 | 5/1966 | German Democratic Rep. | 248/237 |
| 237950 | 6/1945 | Switzerland | 248/200 |
| 1075403 | 7/1967 | United Kingdom | 248/291 |

*Primary Examiner*—J. Franklin Foss
*Assistant Examiner*—Robert A. Olson
*Attorney, Agent, or Firm*—Cushman, Darby & Cushman

[57] ABSTRACT

Means of attachment of the kind that comprises a fittings (11) which is easily mountable and dismountable to an object (26) and displaceable sideways with respect to this. The purpose is to provide a means of attachment which is easily mountable and dismountable, which can be fixed along the edge sides of the object without using tool, which is simple and cheap in manufacturing and which offers a strong and effective attachment. These problems have been solved by the fact that the object (26) is provided with grooves (27,28) or the like arranged substantially parallel, spaced apart and opposite each other, that the fittings (11) consists of two plate-shaped parts (12,13) partially overlapping each other, the brought-together position of which corresponds to the distance between the grooves (27,28), and that at least one part (12) is designed with means (17) arranged to fix the free end section (18) of the other part (13) against displacement across the plane of the parts.

3 Claims, 7 Drawing Figures

MEANS OF ATTACHMENT

The present invention relates to a means of attachment of the kind that comprises a fitting which is easily mountable and dismountable to an object and displaceable sideways with respect to this.

BACKGROUND OF THE INVENTION

In many connections there is a desire to fasten an object to a frame, which can be of such a kind that the locations of the fastening points are not decided beforehand. There is also often a desire to be able to fasten the object either along its long sides of its short sides or along all four side edges of the object and preferably without using tools.

If the object is for example a solar collector cassette which is to be mounted to a slanting roof, it is required that the cassette should be easily mountable and dismountable without making any infringement in the cassette, which in some cases can consist of a water reservoir.

THE OBJECT AND MOST IMPORTANT FEATURES OF THE INVENTION

The object of the present invention is to provide a means of attachment which is easily mountable and dismountable, which anywhere along one edge side of the object can be fixed without using any tool, which is simple and cheap in manufacturing and which offers a strong and effective attachment. These problems have been solved by the fact that the object is provided with grooves or the like arranged substantially parallel, spaced apart and opposite each other, that the fittings consists of two plate-shaped parts partially overlapping each other, the brought-together position of which corresponds to the distance between the grooves and that at least one part is designed with means arranged to fix the free end section of the other part against displacement across the plane of the parts.

The invention will be described below with reference to the enclosed drawings which show some embodiments.

DESCRIPTION OF THE EMBODIMENT

Figure 1:
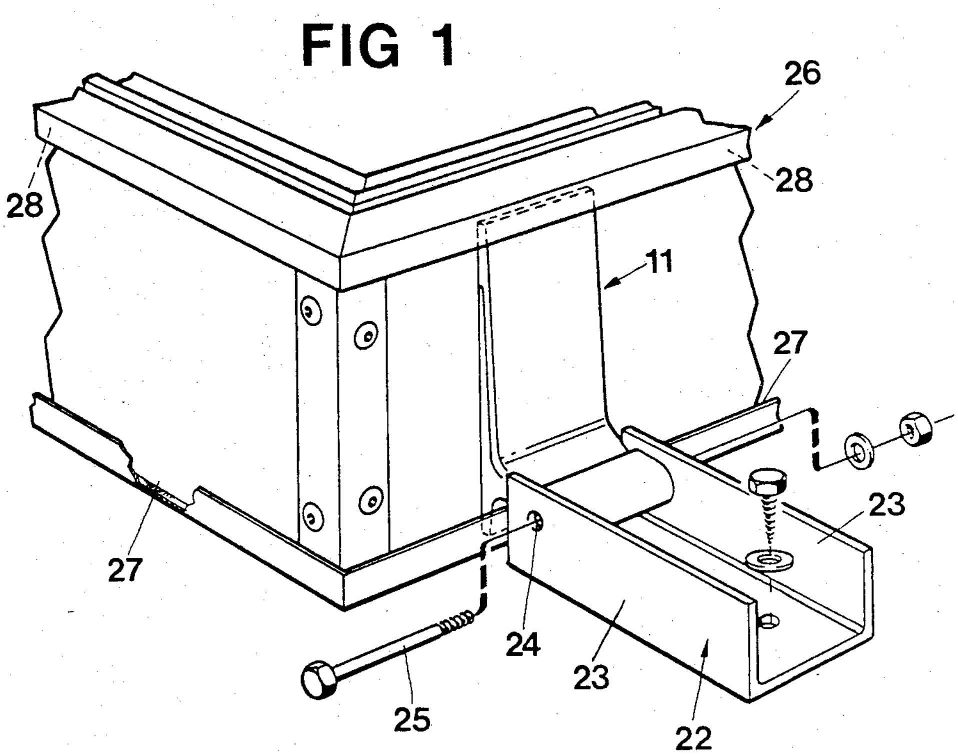
FIG. 1 shows in perspective a front part of a plate-shaped object provided with means of attachment according to the invention.

The means of attachment 11 according to the invention consists of a two piece fittings comprising two plate-shaped parts 12 and 13, which partially overlap each other, at which in the second part 13 there is arranged a rear recess 14 corresponding to the somewhat tapering section 15 of the first part 12. The first part 12 is provided with a bracket 16 projecting therefrom provided with an open groove 17 in the direction towards the section 15, in which groove the end edge 18 of the second part 13 is insertable from the side. The lower section 19 of the part 13 is designed in the corresponding way as the bracket 16. The outer end section 20 of the bracket 16 is provided with a transverse hole 21, which together with said end section make one part of a hinge connection. The other part comprises a member 22 in the form of a U-profile bar, the free space between its shanks 23 corresponds to the width of the parts 12 and 13, as it is shown in FIG. 1. The shanks 23 of the U-profile bar are provided with bores 24 for screw serving as a hinge axle 25, which is threaded through the hole 21 in the bracket 16 and is fixed by means of a nut.

The two parts 12 and 13 of the means of attachment 11 requires at the object 26 at which it is to be attached, two parallel grooves 27 and 28, which are arranged at some distance from and just opposite each other, in which the lower edge 29 of the part 12 respectively the upper edge 30 of the second part 13 is insertable.

The mounting of the means of attachment is done by placing the two parts 12 and 13 with their edge sections 29 and 30 in the respective grooves 27 and 28, after which the parts are displaced towards each other, at which the section 15 will be located in the recess 14, which the section 19 with its front end edge 18 will be located in the groove 17 of the bracket 16. The parts 12 and 13 are fixed against relative displacement by means of shanks 23 of the member 22, the member being fixed to the parts by means of the hinge axle 25. The member 22 thus beside its fixing function for the parts 12 and 13 works as a hinge and as an attachment for the object against a base.

Figure 3:
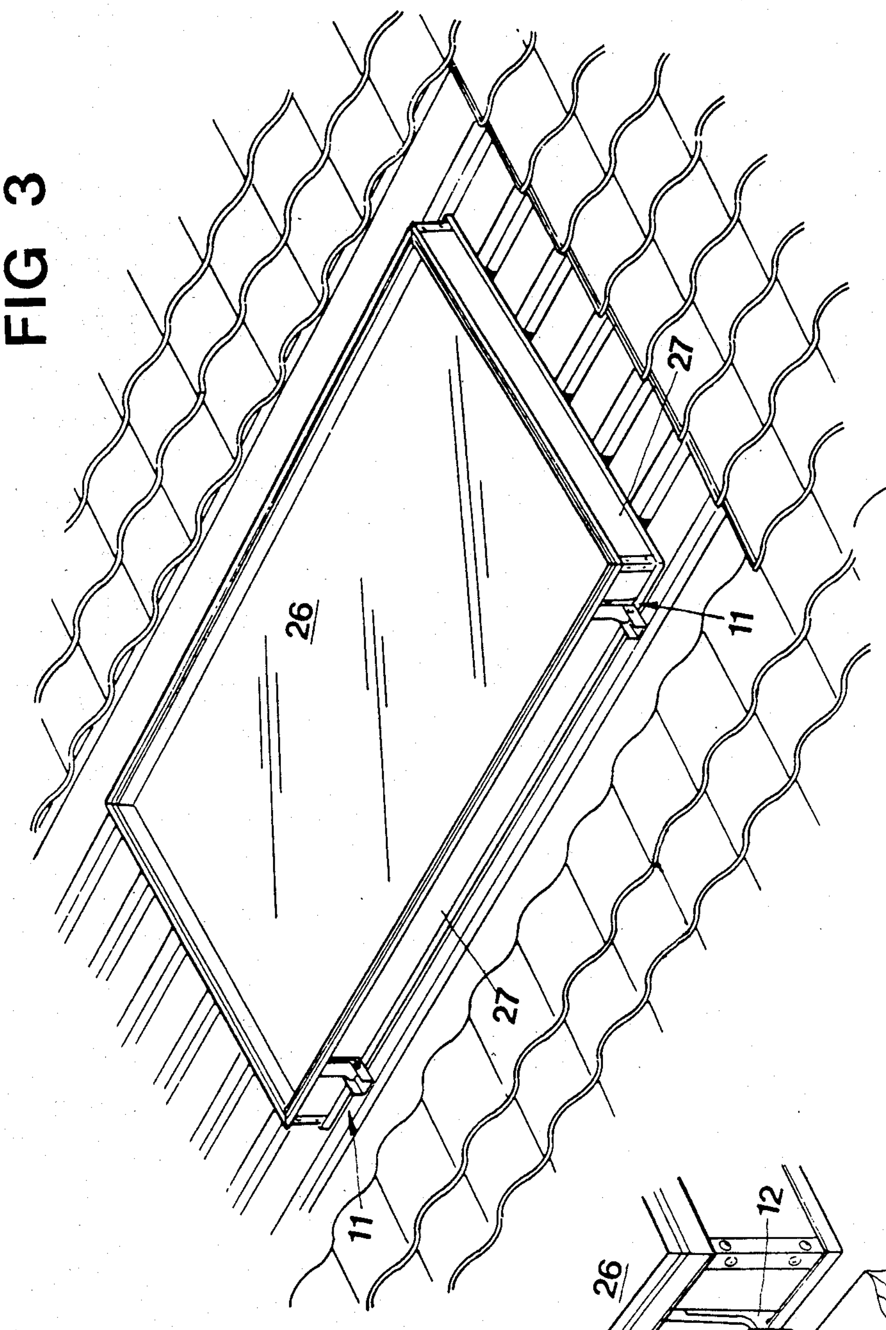
FIG. 3 shows also in perspective the means of attachment applied to a roof cassette, with the cassette arranged in the plane of the roof, and showing an enlarged means of attachment in a circle.
Figure 3A:
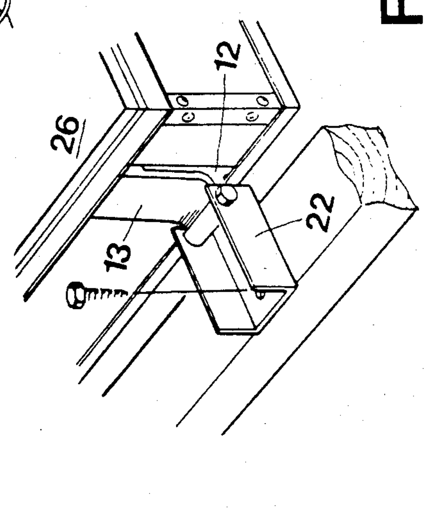
FIG. 3A is a fragmentary view, on an enlarged scale, of part of FIG. 3.
Figure 4:
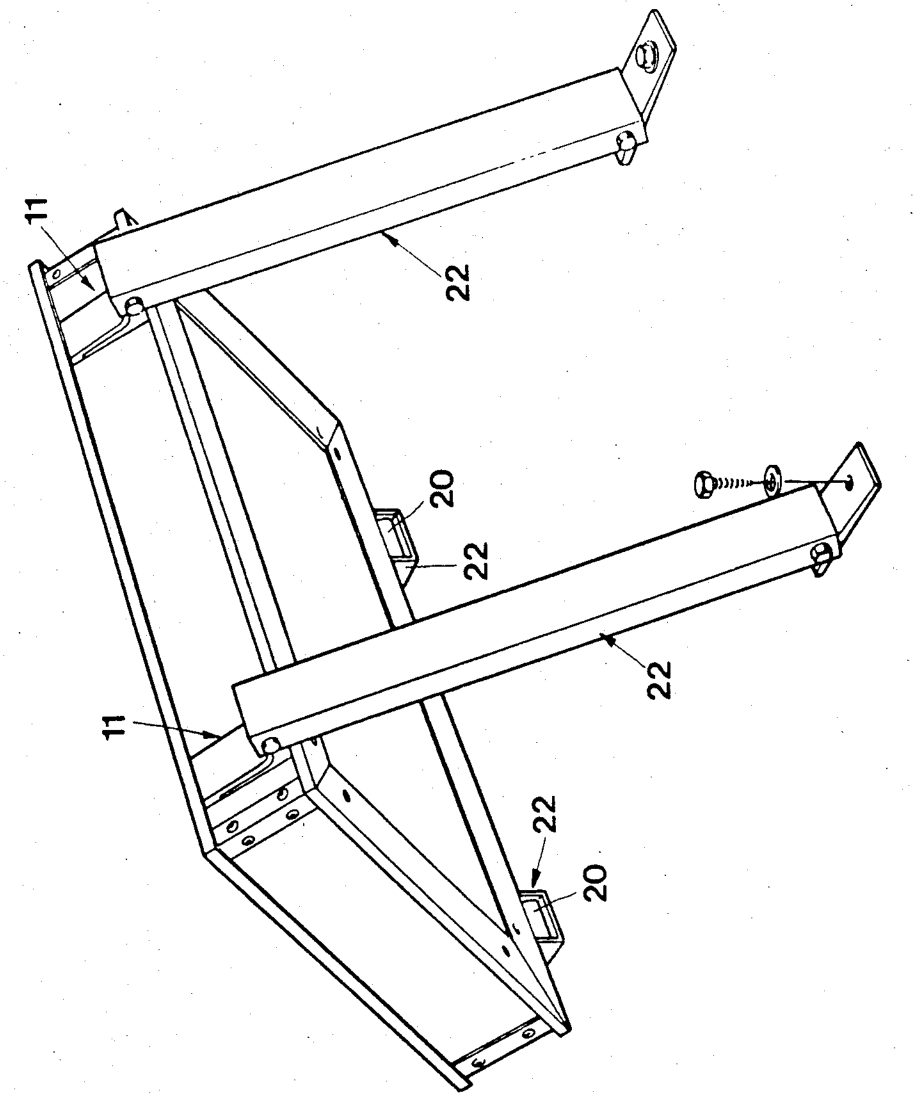
FIG. 4 shows the means of attachment applied at inclined roof cassettes, showing an enlarged means of attachment in a circle.
Figure 4A:
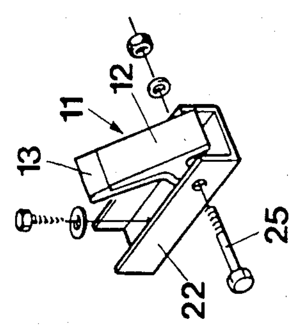
FIG. 4A is a fragmentary view, on an enlarged scale, of part of FIG. 4.

In FIG. 3 the invention is shown applied at a cassette-shaped solar collector which is screwed at the rafter parallel with the roof surface. FIG. 4 shows an applied example where the solar collector cassette is held in an inclined position relative to the horizontal plane by means of the means of attachments according to the invention, at which the members 22 are designed as supports at the upper part of the cassette.

Figure 2:
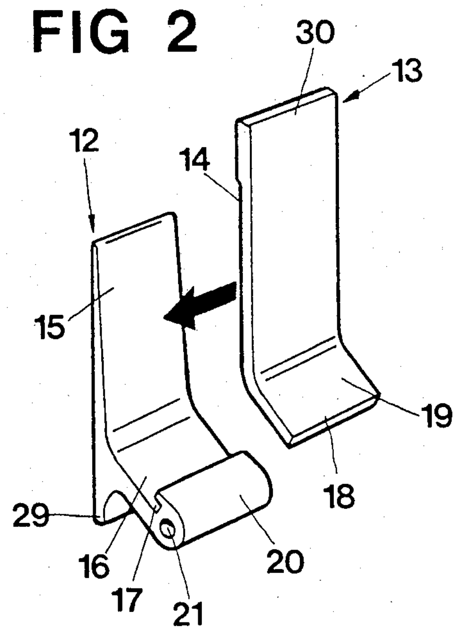
FIG. 2 shows in perspective the fittings of the means of attachment and which consists of two co-operating parts.
Figure 5:
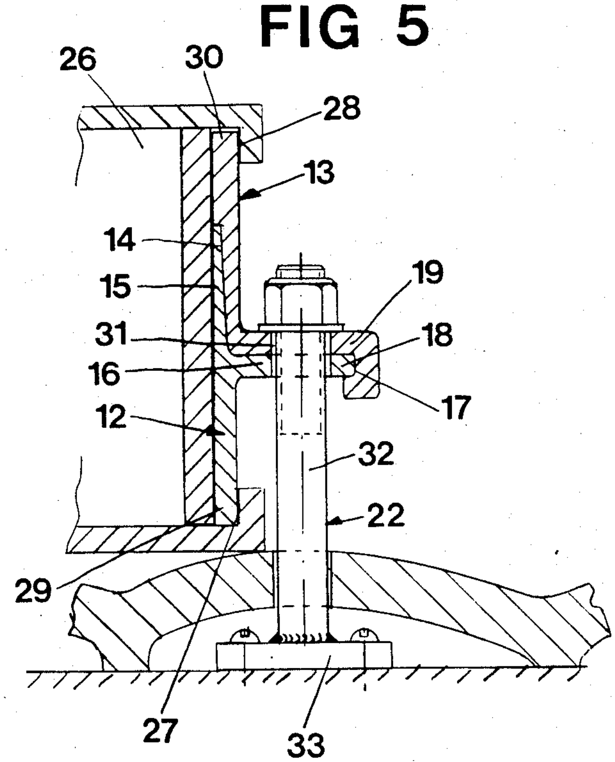
FIG. 5 shows a section through a modified embodiment of the means of attachment according to the invention.

The fixing of the parts 12 and 13 sideways can be done in different ways and in FIG. 5 there is shown a modified procedure, which differs from the embodiment shown in FIG. 1 and 2 by the fact that a through bore 31 for a fastening member 22 in the form of a bolt 32 is provided in the section 19 and the bracket 16, which bolt can be welded on a mounting plate 33.

The invention is not limited to the shown embodiments but modifications are possible within the scope of claims.

I claim:

1. Means of attachment of the kind that comprises a fitting (11) which is easily mountable and dismountable to an object (26) and displaceable sideways with respect to the object, characterized in that the object (26) is provided with grooves (27,28) arranged substantially parallel, spaced apart and opposite each other, that the fitting (11) includes two plate-shaped parts (12–13) partially overlapping each other and lying in a given plane, the brought-together position of which corresponds to the distance between the grooves (27,28), one of the parts including a bracket projecting therefrom and the other part having a free end section, said one part including means to fix said free end section against displacement across the plane of the parts, said means including a groove in said bracket for receiving said free end section, and said bracket having a free edge provided with a through hole parallel to the groove in said bracket for receiving a hinge axle.

2. Means of attachment according to claim 1 characterized in that both parts (12,13) are fixed against displacement sideways by means of at least one member (22) which partially surrounds the ends of the parts.

3. Means of attachment according to claim 2, characterized in that the member (22) comprises a U-profile bar, having shanks (23) which are arranged to fix the parts (12,13) against displacement sideways and a hinge axle extending through holes in the shanks and through said hole in said bracket.

* * * * *